United States Patent [19]

Mochida et al.

[11] Patent Number: 4,638,292

[45] Date of Patent: Jan. 20, 1987

[54] THEFT PREVENTION SYSTEM IN AN AUTOMOTIVE KEYLESS ENTRY SYSTEM WITH AUTOMATIC DOOR LOCKING

[75] Inventors: Haruo Mochida; Hirotoshi Namazue, both of Yokohama, Japan

[73] Assignees: Nissan Motor Company, Limited; Kokusan Kinzoku Kogyo, both of Japan

[21] Appl. No.: 411,096

[22] Filed: Aug. 24, 1982

[30] Foreign Application Priority Data

Aug. 26, 1981 [JP] Japan ................................ 56-132565

[51] Int. Cl.[4] .......................... B60R 25/00; G06F 7/04

[52] U.S. Cl. .................................. 340/63; 340/825.32; 307/10 AT

[58] Field of Search ................ 340/63, 64, 65, 825.56, 340/825.31, 825.32, 543; 307/10 AT; 70/278; 361/172

[56] References Cited

U.S. PATENT DOCUMENTS 3,587,051 6/1971 Hovey .
3,593,816 7/1971 Kazaoka .
3,633,167 1/1972 Hedin .
3,691,396 9/1972 Hinrichs .
3,710,316 1/1973 Kromer .
3,751,718 8/1973 Hanchett, Jr. .
3,754,213 8/1973 Morroni et al. .
3,764,859 10/1973 Wood et al. .
3,781,854 12/1973 Kaufman et al. .
3,812,403 5/1974 Gartner .
3,829,834 8/1974 Frankland et al. .
3,831,065 8/1974 Martin et al. .
3,871,474 3/1975 Tomlinson et al. .
3,878,511 4/1975 Wagner .
3,893,073 7/1975 Angello .
4,114,147 9/1978 Hile .
4,189,712 2/1980 Lemelson .
4,197,524 4/1980 Salem .
4,205,300 5/1980 Ho et al. .......................... 340/64 X
4,205,325 5/1980 Haygood et al. .
4,206,491 6/1980 Ligman .
4,222,088 9/1980 Burton .
4,249,245 2/1981 Nakanashi .

FOREIGN PATENT DOCUMENTS 2948 7/1979 European Pat. Off. .
2913955 10/1980 Fed. Rep. of Germany .

*Primary Examiner*—John W. Caldwell, Sr.
*Assistant Examiner*—Tyrone Queen
*Attorney, Agent, or Firm*—Lowe, Price, LeBlanc, Becker & Shur

[57] ABSTRACT

A theft preventive system, in an automotive keyless entry system with automatic door locking, is adapted to produce an alarm signal in response to door opening when the theft preventive system is in a door-locked position, and which is cooperative with a door-lock system but independently operable in order to switch its operating mode from a door-locked mode to a door-unlocked mode. The theft preventive system in an automotive keyless entry system, according to the present invention, includes a push-button-type function key for operating a door-lock mechanism to lock a vehicle door. A memory circuit is responsive to a door-lock signal fed from the door-lock function key to indicate the door-locked condition. The content of the memory cannot be cleared unless a plurality of door-unlock function keys are properly operated. An alarm circuit is responsive to a door-open signal from a door switch in the presence of a memory output indicative of the door-locked condition to produce an alarm signal.

9 Claims, 1 Drawing Figure

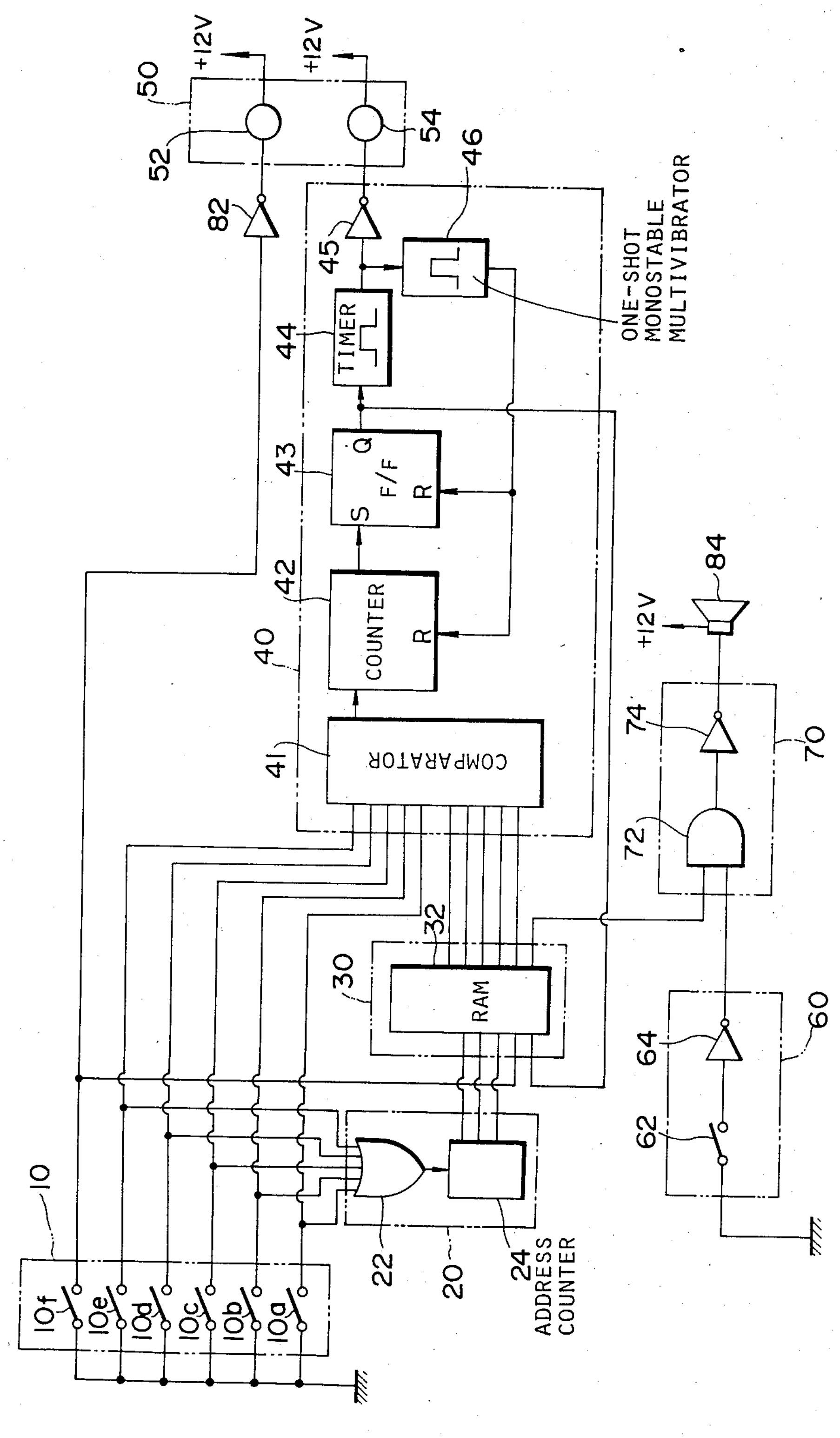
+12V
+12V
50
52
54
46
82
45
ONE-SHOT MONOSTABLE MULTIVIBRATOR
TIMER
44
43
F/F
S
Q
R
42
COUNTER
R
40
84
+12V
41
COMPARATOR
74
70
72
32
30
RAM
64
60
62
10
10f
10e
10d
10c
10b
10a
22
20
24
ADDRESS COUNTER

THEFT PREVENTION SYSTEM IN AN AUTOMOTIVE KEYLESS ENTRY SYSTEM WITH AUTOMATIC DOOR LOCKING

BACKGROUND OF THE INVENTION

The present invention relates generally to a theft prevention system in an automotive keyless entry system for locking and unlocking a vehicle door with an input code inputted from externally mounted push buttons. More particularly, the invention relates to a theft prevention system adapted to produce an alarm signal when the vehicle door is opened while the keyless entry system is maintained in a door-lock mode.

Conventionally, there are various theft preventive alarm systems for a door lock. Such theft preventive alarms associate or cooperate with a cam mechanism in a cylinder lock used for locking and unlocking the vehicle door. An alarm switch in such a system is provided adjacent to the cam mechanism so that the alarm switch is closed while the door is locked. If the vehicle door is opened without resetting the alarm switch, an alarm signal is produced to prevent the vehicle from being stolen. However, since the alarm switch is cooperable with the cam mechanism, if the cam mechanism in the door lock system can be placed in the unlocked position by a thief, the alarm switch can be turned off. This way, the conventional theft preventive alarm system cannot prevent door opening by way of operating the cam mechanism.

SUMMARY OF THE INVENTION

Therefore, it is an object of the present invention to provide a theft preventive system in an automotive keyless entry system with automatic door locking, which is adapted to produce an alarm signal in response to door opening when the theft preventive system is in the door-lock position, and which is cooperative with a door-lock system but independently operable in order to switch its operating mode from door-lock mode to door-unlock mode.

In order to accomplish the above-mentioned and other objects, there is provided a theft preventive system in an automotive keyless entry system, according to the present invention, including a push-button-type function key for operating a door-lock mechanism for locking a vehicle door. A memory circuit is responsive to a door-lock signal fed from the door-lock function key to set the door-lock condition. The content of the memory cannot be cleared unless a door-unlock function key is operated. An alarm circuit is responsive to a door-open signal fed from a door switch in the presence of a memory output indicative of the door-locking condition to produce an alarm signal.

BRIEF DESCRIPTION OF THE DRAWINGS

The invention will be more fully understood from the detailed description given herebelow and from the accompanying drawing of the preferred embodiment of the invention, which, however, should not be taken as limitative to the invention but for elucidation and explanation only.

BRIEF DESCRIPTION OF THE DRAWINGS

The drawing shows a circuit diagram of the preferred embodiment of the theft preventive system as incorporated in an automotive keyless entry system according to the present invention.

DESCRIPTION OF THE PREFERRED EMBODIMENTS

Referring to the drawing, there is illustrated the preferred embodiment of the theft preventive system according to the present invention, which is incorporated in an automotive keyless entry system with an automatic door-lock system. In order to operate a door-lock mechanism 50, a door-locking actuator 52 and a door-unlocking actuator 54 are provided in the door-lock mechanism. The door-locking and door-unlocking actuators 52 and 54 are respectively activated by input signals inputted from a keyboard 10 with a plurality of push buttons 10*a* to 10*f*. In the shown embodiment, the push button 10*f* acts as a door-lock function key. The push button 10*f* is connected to the door-locking actuator 52 via an inverter 82. The push button 10*f* is also connected to a memory circuit 30 including RAM 32 in order to feed thereto an input signal indicative of door-locking state.

To the memory circuit 30, other push buttons 10*a* to 10*e* are connected via an address signal generator 20. The address signal generator 20 comprises an OR gate 22 and an address counter 24. The address counter 24 is adapted to tally the number of gate signals from the OR gate 22 and produce an address signal having a value representative of the counter value therein. The address signal from the address counter is fed to the RAM 32 in the memory circuit 30 in order to access the corresponding memory address of the RAM.

In each memory address of the RAM 32 is stored a preset value which constitutes a preset code number for door unlocking in combination with the preset values in the remaining memory addresses. The RAM 32 is responsive to the address signal to access the corresponding address to produce a preset code signal to be fed to a comparator 41. Therefore, every time one of the push buttons 10*a* to 10*e* is depressed, the preset value in the corresponding memory address in the RAM 32 is read out and fed to the comparator 41. At the same time, an input signal from the depressed push button 10*a* to 10*e*, which has a value representing a code assigned to each of the push buttons, is fed to the comparator 41.

The preset code consists of several encoded digits, each of which has the preset value stored in the corresponding memory address of the RAM 32. The comparator compares the preset code from the RAM with the input code from the push button everytime one of the push buttons 10*a* to 10*e* is depressed. The comparator 41 produces a comparator signal when the signal values fed from the RAM and from the push buttons 10*a* to 10*e* match; in other words, the input code is the preset code as stored in RAM 32. The comparator signal is fed to a counter 42. The counter 42 is adapted to produce a counter signal when the counter value reaches a given value. Assuming the preset code consists of five encoded digits, the counted value in the counter 42 necessary to produce the counter signal is five. The counter signal is fed to the set input terminal of a flip-flop 43 to set the latter. The flip-flop 43 produces a flip-flop signal while it is set to activate a timer 44 for a given period of time. The timer 44 produces a HIGH level timer signal while it is activated and otherwise produces a LOW level timer signal. The HIGH level timer signal is inverted by an inverter 45 and applied to the door unlocking actuator 54 as a LOW level signal. The door unlocking actuator 54 is responsive to this LOW level signal to operate the door lock mechanism to move the latter to the unlocked position.

After the given period expires, the time signal level turns from HIGH to LOW. A one-shot monostable multivibrator 46 connected to the timer 44 is responsive to the change of the timer signal from HIGH level to LOW level to produce a trigger pulse. The trigger pulse of the one-shot monostable multivibrator 46 is fed to a reset input terminal of the flip-flop 43 to reset the latter. At the same time, the trigger pulse is fed to a reset input terminal of the counter 42 to clear the counter value.

On the other hand, the RAM 32 is connected to the push button **10*f* and is adapted to produce a door-lock signal when push button 10*f* is depressed. The RAM 32 is also connected to the output terminal Q of the flip-flop 43 in order to receive the flip-flop signal. The flip-flop signal serves as a reset signal to cause the RAM 32 to cease outputting the door-lock signal when the proper input code is used to unlock the door. The door-lock signal is fed to an AND gate 72 in a theft preventive alarm circuit 70. The other input terminal of the AND gate 72 is connected to a door switch 62 in a door-open detector 60 via an inverter 64. The door switch 62 is adapted to produce a LOW level door-open signal in response to door opening. The LOW level door-open signal is inverted by the inverter 64 and inputted to the AND gate 72 as a HIGH level signal. In the presence of the door-lock signal from the RAM 32, the AND gate 72 is responsive to the HIGH level signal from the door switch 62 through the inverter 64 to produce a HIGH level gate signal. The gate signal is inverted by an inverter 74 and then applied to an alarm device 84 as a LOW level signal. The alarm device 84** is responsive to the LOW level signal to produce an alarm to prevent theft of the vehicle.

As will be appreciated hereabove, in the shown embodiment, the door unlocking can be done by inputting the preset code. At this case, the RAM 32 stops sending the door-lock signal to the AND gate 72 of the alarm circuit. Thus, even when the door is opened, the alarm is not produced. Alternatively when the push button **10*f* is depressed and thus the door-lock mechanism is placed in the door-locked position, the RAM produces the door-lock signal to be fed to the AND gate 72. At this condition, if the door is opened, AND condition of the AND gate 72** is established and thus the alarm is produced.

Therefore, even if the door-lock mechanism is damaged or manipulated into the door-unlocked position by a thief, since the RAM 32 continues to output the door-lock signal unless it is turned off by the preset input code, the theft preventive alarm will be produced in order to reliably prevent unauthorized entry of the vehicle.

While the present invention has been described in detail in terms of the preferred embodiment, the invention can be modified or embodied otherwise in any way without departing from the principle of the invention. Therefore, it should be appreciated that the present invention includes all of possible modifications and embodiments pertaining to the gist of the invention.

What is claimed is:

1. A theft prevention system in an automotive keyless entry system comprising:

a vehicle door-lock mechanism:

an actuator associated with said door-lock mechanism to operate the door-lock mechanism to a first, door-locked, position and to a second, door-unlocked, position;

an input unit including a plurality of push buttons respectively representing preset values;

first means, comprising a preselected door locking push button in said input unit, for operating said actuator to operate said door lock-mechanism to said first position when said door locking push button is depressed;

second means for operating said actuator to operate said door-lock mechanism to said second position;

third means, associated with said first and second means, for continuously producing a first signal when said actuator is operated to maintain said door-lock mechanism at said first position in response to depression of said door locking push button, said third means being responsive to operation of said first means to produce said first signal and being responsive to operation of said second means to stop producing said first signal;

fourth means for producing a second signal in response to opening of the vehicle door; and fifth means for producing a theft preventive alarm upon simultaneous occurrence of both of said first and second signals.

2. A theft prevention system in an automotive keyless entry system comprising:

a vehicle door-lock mechanism;

an actuator associated with said door lock mechanism to operate the door-lock mechanism to a first, door-locked, position and to a second, door-unlocked, position;

an input unit including a plurality of push buttons respectively representing preset values;

first means, comprising a preselected door locking push button in said input unit, for producing a door-lock signal to cause said actuator to operate said lock-mechanism to said first position when said door locking push button is depressed;

second means, comprising a plurality of said push buttons in said input unit for entry of an input code and a comparator comparing said input code with a preset code, for producing a door-unlock signal to cause said actuator to operate said door-lock mechanism to said second position;

third means, associated with said first and second means, for continuously producing a first signal in response to said door-lock signal, said third means being responsive to said door-unlock signal to stop producing said first signal when said input code matches said preset code;

fourth means for producing a second signal in response to opening of the vehicle door; and fifth means for producing a theft preventive alarm upon simultaneous occurrence of both of said first and second signals.

3. The system as set forth in claim 1, wherein said second means comprises an input unit for inputting a code and a comparator for comparing said input code with a preset code to cause said actuator to operate said door-lock mechanism to said second position.

4. The system as set forth in claim 2 or 3, wherein said third means comprises a memory which is adapted to produce said first signal while said actuator is operated to maintain said door-lock mechanism at said first position.

5. The system as set forth in claims 1 or 3, wherein said input code and said preset code both consist of several encoded digits.

6. A theft prevention system in an automotive keyless entry system comprising:

a vehicle door-lock mechanism;

actuator means associated with said door-lock mechanism and operative between first and second positions to actuate said door-lock mechanism to door-locking and door-unlocking states, respectively;

controller means including a memory storing a preset code for comparison with an input code provided by a plurality of push buttons representing preset values, said push buttons forming an input unit for entry of the input code, a comparator means for comparing the imput code and the preset code to operate said actuator means to said second, door-unlocking, position only when the input code and the preset code match each other, said controller means including a door lock signal generator means responsive to a specific input from a preselected door locking push button of said input unit for operating said actuator means to said first position for actuating said doorlock mechanism to said door-locking state, said controller means operable in response to said specific input for continuously outputting a first signal and for terminating said first signal only when said input code and said preset code match each other, a door open detector means associated with a vehicle door and responsive to detection of an open position of the door for producing a second signal in response to opening of the vehicle door; and alarm means for producing a theft preventive alarm in response to simultaneous occurrence of said second signal together with said first signal.

7. A theft prevention system in an automotive keyless entry system comprising:

a vehicle door-lock mechanism;

actuator means associated with said door-lock mechanism and operable between first and second positions to operate the door-lock mechanism to a first door-locking state and a second door-unlocking state;

controller means associated with said actuator means for operating the actuator means to said first and second positions, said controller means including a memory storing a preset code, a plurality of push-buttons representing preset values, said push buttons forming a manually operable input unit for entry of input code, and a comparator means for comparing said preset code and said input code to operate said actuator means to said second position whenever said input code matches said preset code, said controller means being responsive to a specific code provided by a door locking push button to continuously operate said actuator means to said first position and for producing a first signal while said actuator means is maintained at said first position;

detector means for detecting an open condition of the door for producing a second signal in response to opening of the vehicle door; and alarm means for producing a theft preventive alarm in response to simultaneous occurrence of said second signal together with said first signal.

8. A theft prevention system for an automotive vehicle, comprising;

a vehicle door with a door-lock mechanism;

an electromagnetically operative actuator associated with said door-lock mechanism, said actuator being operable to first and second positions, at said first position said actuator operating said door-lock mechanism to a first, door-locking state, and at said second position said actuator operating said door-lock mechanism to a second, door-unlocking state;

controller means associated with said actuator for controlling the position of the actuator, said controller including a memory storing a preset code, a plurality of push buttons representing preset values, said push buttons forming an input means for allowing manual input of an input code, and a comparator means responsive to the input code matching said preset code for feeding a control signal to said actuator to operate the actuator to said second position, said controller means including means responsive to a specific input provided through said input means to operate said actuator to said first position and to produce continuously a locking state indicative signal;

a door switch adapted to be turned on when the door is open; and alarm generator means associated with said controller means and said door switch to produce an alarm in response to simultaneous turning on of said door switch and existence of said locking state indicative signal.

9. A theft prevention system for an automotive vehicle comprising:

a vehicle door with a door-lock mechanism;

an actuator associated with said door-lock mechanism and operative between a first position in which the actuator operates said door-lock mechanism to a first door-locking state and a second position in which the actuator operates said door-lock mechanism to a second, door-unlocking state;

controller means associated with said actuator for feeding a control signal thereto to operate said actuator to one of said first and second positions, said controller means including a memory storing a preset code, a plurality of push buttons representing preset values, said push buttons forming an input means receiving manual input of an input code, a control signal generator means responsive to a given specific input from a door-locking push button through said input means to place said actuator at said first position and to hold the actuator at said first position, and responsive to said input code matching said preset code to operate said actuator to said second position, said controller means outputting a door-locking state indicative signal whenever said actuator is held at said first position;

a door open detector associated with said vehicle door and adapted to produce a door open state indicative signal as long as the door is held at an open state;

an alarm means associated with said controller and said detector for producing a theft preventive alarm when an AND condition of the door-locking state indicative signal and the door-open state indicative signal is established; and AND gate means for providing to said alarm means a signal indicative of existence of said AND condition of said door-locking state indicative signal and the door-open state indicative signal, thereby enabling production of said theft preventive alarm.

* * * * *